US007741990B2

(12) United States Patent
Aprile

(10) Patent No.: US 7,741,990 B2
(45) Date of Patent: Jun. 22, 2010

(54) METHOD AND APPARATUS FOR DETECTION OF MOVING OBJECTS BY SAR IMAGES

(75) Inventor: Angelo Aprile, Giussago (IT)

(73) Assignee: Selex Galileo S.p.A. (IT)

( * ) Notice: Subject to any disclaimer, the term of this patent is extended or adjusted under 35 U.S.C. 154(b) by 104 days.

(21) Appl. No.: 11/774,435

(22) Filed: Jul. 6, 2007

(65) Prior Publication Data
US 2008/0224923 A1 Sep. 18, 2008

(30) Foreign Application Priority Data
Jul. 7, 2006 (EP) .................................. 06425473

(51) Int. Cl.
*G01S 13/90* (2006.01)
(52) U.S. Cl. ...................... 342/25 B; 342/159; 342/179
(58) Field of Classification Search ............... 342/25 R, 342/25 A–25 F, 159–161, 94–96, 179
See application file for complete search history.

(56) References Cited

U.S. PATENT DOCUMENTS

| | | | | | |
|---|---|---|---|---|---|
| 3,975,734 | A | * | 8/1976 | Payne | ........................ 342/25 B |
| 4,975,704 | A | * | 12/1990 | Gabriel et al. | ............. 342/25 C |
| 5,945,937 | A | * | 8/1999 | Fujimura | ................... 342/25 C |
| 6,426,718 | B1 | * | 7/2002 | Ridgway | .................... 342/160 |
| 7,298,867 | B2 | * | 11/2007 | Slaski | ........................ 382/103 |
| 7,333,046 | B2 | * | 2/2008 | Perry et al. | ............... 342/25 B |
| 7,456,780 | B1 | * | 11/2008 | Garren | ...................... 342/25 A |
| 2004/0032361 | A1 | | 2/2004 | Kirscht | ........................ 342/25 |

FOREIGN PATENT DOCUMENTS

| GB | 2258361 | 2/1993 |
|---|---|---|
| WO | WO 00/37965 | 6/2000 |

OTHER PUBLICATIONS

Hong, Z., et al, "Single-channel UWB SAR ground moving targets detection method using change detection based on single-pass sub-aperture images", Synthetic Aperture Radar, 2007, APSAR 2007, 1$^{st}$ Asian and Pacific Conference on, Nov. 5-9, 2007, pp. 266-270.*
Wang et al. "Dual-Speed SAR Imaging of Moving Targets". Record of the 1999 IEEE Radar Conference, Apr. 20, 1999, pp. 227-232.
European Search Report dated Dec. 8, 2006 issued in corresponding European Patent Application No. 06425473.3.

* cited by examiner

*Primary Examiner*—Thomas H Tarcza
*Assistant Examiner*—Cassi Galt
(74) *Attorney, Agent, or Firm*—Ostrolenk Faber LLP

(57) ABSTRACT

A method for the detection of moving objects by SAR images envisages the steps of: generating a pulse-repetition frequency signal starting from a radar signal; and generating a sequence of SAR images starting from the pulse-repetition frequency signal. In particular, SAR images with low azimuth resolution are generated by of coherent integration of the pulse-repetition frequency signal for a sub-aperture time shorter than an aperture time. In addition, the method envisages generating difference images through point-to-point difference between subsequent low azimuth resolution SAR images, and recognizing patterns associated to moving objects in the difference images.

19 Claims, 4 Drawing Sheets

METHOD AND APPARATUS FOR DETECTION OF MOVING OBJECTS BY SAR IMAGES

CROSS-REFERENCE TO RELATED APPLICATION

The present application claims priority to European Patent Application No. 06425473.3, filed Jul. 7, 2006, the disclosure of which has been incorporated herein by reference.

The present invention relates to a method and an apparatus for detection of moving objects by SAR images.

BACKGROUND OF THE INVENTION

SAR (Synthetic-Aperture Radar) is a microwave pulse-transmission radar system carried by an aircraft.

The use of microwaves enables acquisition of images at any moment, irrespective of whether it is day or night and irrespective of the meteorological conditions, and consequently SAR is widely used in environmental monitoring, in military applications, in geological mapping, and in other applications.

The energy of the radar pulse, transmitted by an antenna, is reflected by ground surface in all directions, and part thereof is captured by the same transmitting antenna. This signal, generally referred to as "echo", is then processed for generating a sequence of images. The sequence of images is obtained by integrating the radar signal over a given time interval, referred to also as time of observation.

The image resolution in the direction of pointing of the antenna (range direction) depends exclusively upon the bandwidth of the microwave pulses transmitted. The image resolution in the direction perpendicular to the direction of pointing of the antenna (azimuth direction or cross-range direction) depends upon the time of observation, i.e., the time of reception of the echo signal. In order to obtain a high resolution image, quite long observation times are necessary, which generally depend upon the distance observed and upon the velocity of the radar platform, and may even be of the order of tens of seconds. Consequently, recognition and location of possible moving objects in the scene observed are very imprecise. In a way similar to what occurs with an ordinary camera, in fact, a moving object gives rise to a "wake" in the image acquired. Obviously, the wake is all the more evident, the longer the time of observation and the faster the object is moving.

SUMMARY OF THE INVENTION

The aim of the present invention is hence to provide a method and an apparatus for detection of moving objects by SAR images that will be able to overcome the described drawbacks of the prior art and that at the same time will be fully efficient and reliable.

According to the present invention, a method and an apparatus for detection of moving objects by SAR images are provided, as claimed in the attached Claims.

BRIEF DESCRIPTION OF THE DRAWINGS

For a better understanding of the invention, some embodiments thereof will now be described, purely by way of non-limiting example and with reference to the attached drawings, wherein.

DETAILED DESCRIPTION OF THE INVENTION

Figure 1:
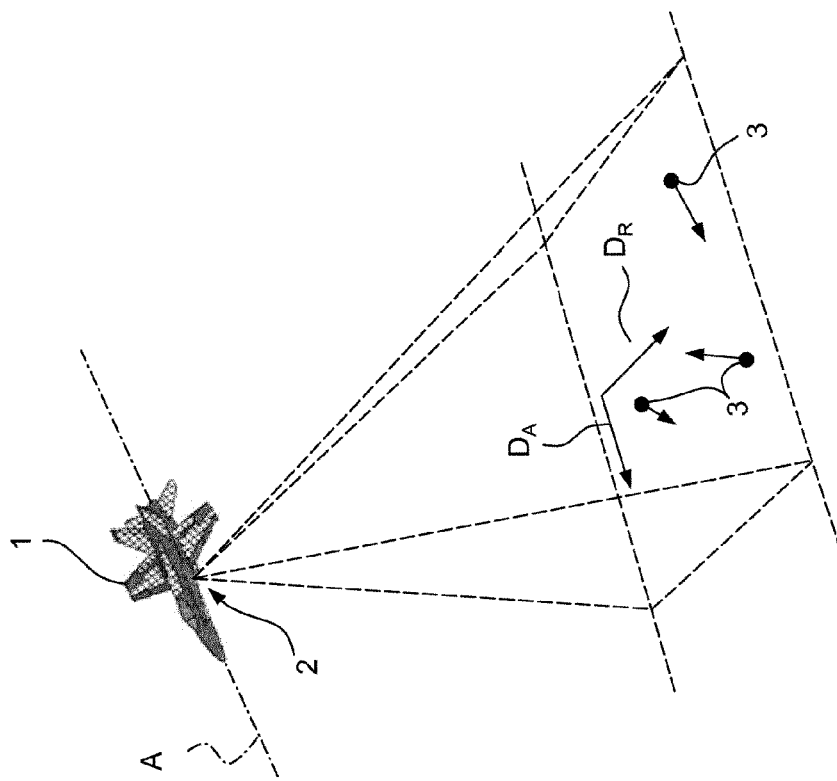
FIG. 1 schematically shows an aircraft equipped with an apparatus for detection of moving objects by SAR images according to the present invention, and moving surface targets.

FIG. 1 shows, by way of example, an aircraft 1, which is moving in a pre-determined direction A with a velocity $\vec{V}_A$ and is equipped with a synthetic-aperture radar (SAR) apparatus 2 according to the present invention. FIG. 1 moreover illustrates objects 3 moving on a portion of the Earth's surface illuminated by the SAR apparatus 2.

Figure 2:
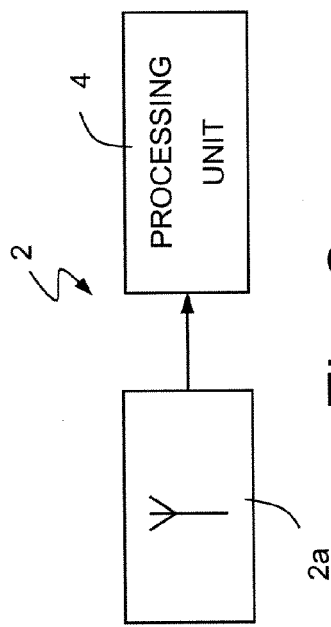
FIG. 2 shows a simplified block diagram of the apparatus of FIG. 1.

As shown in FIG. 2, the SAR apparatus 2 comprises a single-channel radar transceiver 2a, provided with a processing unit 4. The device 2 generates two-dimensional SAR images in the range and azimuth (or cross-range) co-ordinates and moreover recognizes and locates objects moving on the scene being observed, such as for example the surface targets 3. SAR images are images in a numeric format, defined by a matrix of points or pixels, each of which has a respective value indicating the reflectivity of a corresponding portion of the ground surface observed.

Figure 3:
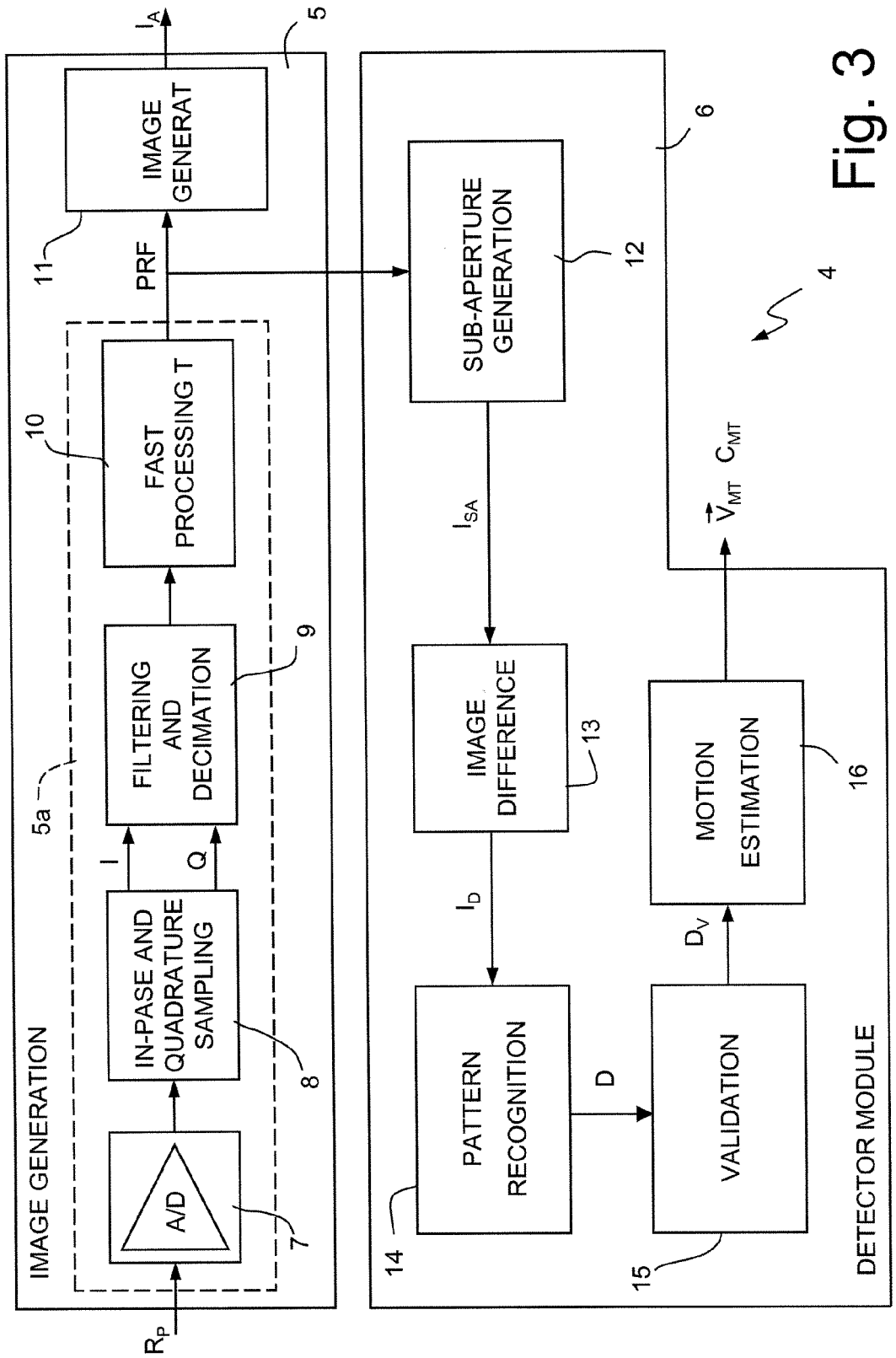
FIG. 3 shows a more detailed block diagram of a part of the apparatus of FIG. 2.

FIG. 3 shows the processing unit 4 implementing the method according to the present invention. In particular, the processing unit 4 comprises an image-generation module 5 and a detector module 6, which operate in parallel. The image-generation module 5 is configured for supplying, starting from the radar signal $R_p$, a sequence of high resolution images $I_A$ given by the aperture $T_A$, in a known way.

In detail, the image-generation module 5 comprises, cascaded to one another, an analog-to-digital converter 7, an in-phase and quadrature sampler 8, a filtering and decimation module 9, and a fast-processing module 10 operating in the time domain, which form a pre-processing line 5a. The image-generation module 5 further comprises an image-generation module 11, arranged downstream of the pre-processing line 5a. The analog-to-digital converter 7 receives at input the radar signal $R_p$ captured by the radar transceiver 2a and converts it into a numeric format. The in-phase and quadrature sampler 8 extracts an in-phase signal I and a quadrature signal Q from the digitized radar signal $R_p$ and supplies them to the filtering and decimation module 9. The fast-processing module 10 operates in the fast-time domain (i.e., in the time domain associated to processing in the range direction) and, in a known way, supplies a pulse-repetition frequency signal PRF starting from the in-phase signal I and from the quadrature signal Q, which are filtered and decimated. In particular, the fast-processing module 10 is configured for carrying out a procedure for compensating the motion of the SAR apparatus 2 (i.e., of the aircraft 1) with respect to the portion of the ground surface illuminated. Finally, the image-generation module 11 produces a sequence of two-dimensional high resolution images $I_A$, by coherent integration of the pulse-repetition frequency signal PRF.

In greater detail, the high resolution images $I_A$ present a resolution in the range direction or range resolution $R_R$ and a resolution in the azimuth (or cross-range) direction or azimuth (or cross-range) resolution $R_A$ that are substantially the same as one another. Hereinafter, by "range direction $D_R$" is meant a direction that is radial with respect to the radar transceiver 2a, and by "azimuth (or cross-range) direction $D_A$" is meant a direction perpendicular to the range direction. Normally, the azimuth direction is parallel to the motion direction A of the aircraft 1.

The coherent integration time of the pulse-repetition frequency signal PRF necessary for obtaining an azimuth resolution $R_A$ that is equal to the range resolution $R_R$ is referred to as "synthetic aperture" or "aperture time" $T_A$. In practice, considering the velocity $\vec{V}_A$ of the aircraft 1, the aperture time $T_A$ is given by the extension or aperture that a radar antenna would need to have to obtain an azimuth resolution $R_A$ and a range resolution $R_R$ that are the same as one another.

The detector module 6 is configured for detecting and locating the objects 3 moving on the portion of the ground surface illuminated by the SAR apparatus 2. In particular, the detector module 6 supplies a list of the moving objects 3 with the respective co-ordinates $C_M$ and velocity $V_M$ (module and direction) starting from the pulse-repetition frequency signal PRF at output from the fast-processing module 10.

In greater detail, the detector module 6 comprises a sub-aperture generator 12, an image-difference module 13, a pattern-recognition module 14, a validation module 15, and a motion-estimation module 16.

The sub-aperture generator 12 generates a sequence of low azimuth resolution images $I_{SA}$ obtained by coherent integration of the pulse-repetition frequency signal PRF for a sub-aperture or sub-aperture time $T_{SA}$ shorter than the aperture $T_A$. By way of example, the sub-aperture $T_{SA}$ is approximately 0.25 s; normal values for the aperture $T_A$ are generally higher than 1 s and can reach 8-10 s.

The image-difference module 13 receives on its input the sequence of low azimuth resolution images $I_{SA}$ and performs a pixel-by-pixel difference between consecutive low azimuth resolution images $I_{SA}$, supplying a sequence of difference images $I_D$ on its output.

The pattern-recognition module 14 receives on its input the sequence of difference images $I_D$ and processes it for identifying specific patterns typically associated to the movement of an object (hereinafter referred to as "doublets" D). In practice, the pattern-recognition module 14 processes each difference image $I_D$ to recognize the doublets D present and supplies a list of the recognized doublets D to the validation module 15. The validation module 15 carries out a validation procedure for recognizing series of doublets D effectively corresponding to respective moving objects 3 and for eliminating any possible artifacts due to false alarms or to residues of the other-than-perfect motion compensation applied by the fast-processing module 10.

The motion-estimation module 16 receives the sequence of the validated doublets $D_V$ from the validation module 15 and processes them so as to reposition the moving objects 3 in a map, associating to each of them a position $C_M$ (in range and azimuth co-ordinates) and a velocity $V_M$ (modulus and direction).

Figure 4:
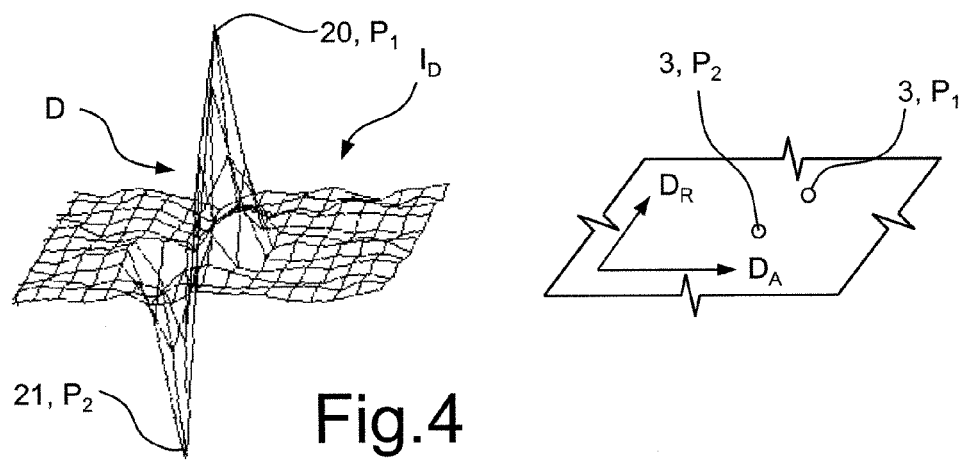
FIG. 4 shows a schematic representation of quantities regarding the present invention.

As indicated previously, the detector module 6 uses the low azimuth resolution images $I_{SA}$ produced by the sub-aperture generator module 12. In a low azimuth resolution image $I_{SA}$, the azimuth resolution $R_A$ is degraded with respect to a high resolution image $I_A$, since the low azimuth resolution image $I_{SA}$ is obtained considering shorter times of coherent integration. However, the trace of moving objects 3 is much more concentrated and hence enables more precise location. In addition, the detector module 6 works on the difference images $I_D$ (between consecutive low azimuth resolution images $I_{SA}$), which contain particularly significant information as regards the moving objects 3. In fact, the portions of the difference images $I_D$ for immobile objects are substantially zero: in two consecutive low azimuth resolution images $I_{SA}$, in fact, the reflectivity values corresponding to immobile objects remain unvaried and are hence eliminated by the difference operation. As shown in FIG. 4, instead, a moving object 3 produces, in the difference image $I_D$, a doublet D, i.e., a waveform that comprises two regions 20 close to one another, each having a homogeneous sign but opposite to the sign of the other. In addition, pre-determined morphological characteristics of the first region (RP) and of the second region (RN) are equal, except for a pre-determined tolerance. In particular, the regions 20 have respective peaks of substantially the same amplitude and of opposite sign (hereinafter referred to also as "dual" peaks). The peak 21, which is positive, indicates a position $P_1$ of the object in the most recent low azimuth resolution image $I_{SA}$, whereas the peak which is negative, indicates a position $P_2$ of the object in the least recent low azimuth resolution image $I_{SA}$. In addition, the distance between the dual peaks 21 of the doublet D indicates the space covered by the moving object 3 in an interval of time equal to the sub-aperture $T_{SA}$. Consequently, each doublet D also supplies information regarding the velocity $V_M$ of the corresponding moving object 3.

The pattern-recognition module 14 carries out a first selection, eliminating all the components of the difference image $I_D$ that cannot be put down to doublets D.

A second, more accurate, selection is carried out by the validation module 15, to eliminate components of the difference image $I_D$ that may be regarded as doublets D, but are caused by anomalous fluctuations not produced by the moving objects 3. For this purpose, the validation module 15 carries out a procedure for tracking each doublet D identified, in particular, by verifying the congruence of the movement starting from a series of consecutive difference images $I_D$. For example, a doublet D is validated and associated to a moving object 3 if it persists in a minimum number of consecutive difference images $I_D$, and the positions of the dual peaks are compatible with the velocities previously estimated (i.e., if a minimum number of consecutive difference images $I_D$ contains a series of doublets D compatible with the movement of an object having the velocity $V_M$ estimated on the basis of the positions of the dual peaks of each doublet D of the series). Doublets D that do not meet the validation requirements are not recognized as moving objects and are eliminated.

The tracking procedure moreover supplies an accurate estimation of the velocity $V_M$ of the moving objects associated to the validated doublets $D_V$.

Finally, the motion-estimation module 16 receives from the validation module 15 the sequence of the validated doublets $D_V$, processes them so as to reposition the moving objects 3 in a map, and supplies a list of the moving objects 3 present on the portion of the ground surface illuminated by the SAR apparatus 2, associating to each of them a position $C_M$ and a velocity $V_M$.

Figure 5:
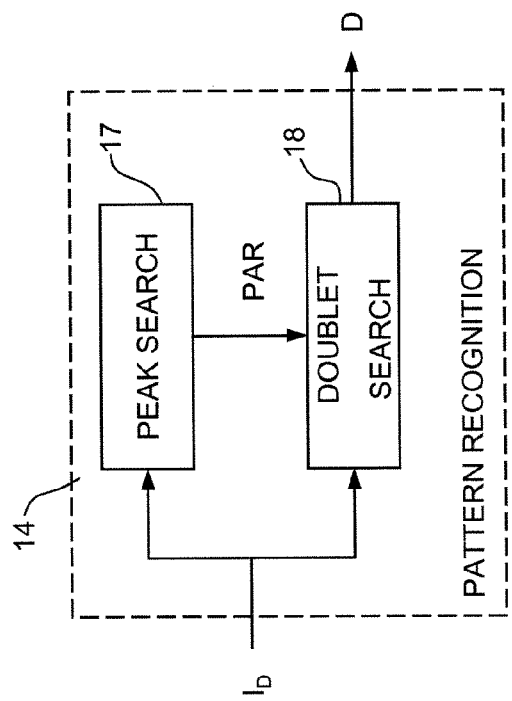
FIG. 5 shows a more detailed block diagram of a part of the block diagram of FIG. 2.

FIG. 5 shows in greater detail the pattern-recognition module 14, which comprises a peak-search module 17 and a doublet-search module 18.

The peak-search module 17 analyses pixel by pixel each difference image $I_D$ received at input and generates a list of all the peak values that exceed a pre-determined threshold, associating them to respective sets of parameters, amongst which the co-ordinates, the amplitude, and the sign.

The doublet-search module 18 scans a neighbourhood A of pre-determined extent around each peak in order to seek a further peak having substantially the same amplitude and opposite sign (dual peak). If the search is successful, the doublet-search module records the presence of a doublet D. The doublets D identified (still not validated) are candidates to being associated to moving objects 3.

Figure 6:
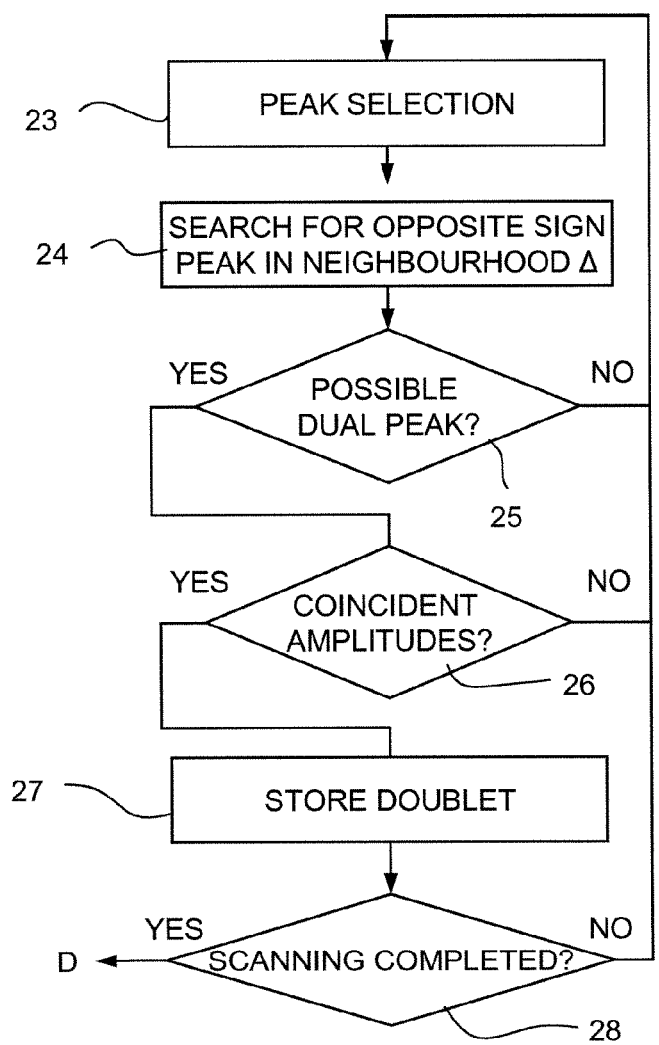
FIG. 6 is a flowchart of a procedure of a method according to one embodiment of the present invention.

The procedure implemented by the doublet-search module 18 is represented in the flowchart of FIG. 6.

Initially (block 23), the doublet-search module 18 selects a peak (n-th peak) from the list of the peaks present in the difference image $I_D$. Next (block 24), the doublet-search module 18 seeks a further possible dual peak of opposite sign in the neighbourhood Δ of the peak selected.

At this point (block 25), if in the neighbourhood Δ no possible dual peak has been identified, the search for doublets D is resumed starting from block 23, with the selection of a new peak ((n+1)th peak). If, instead, in the neighbourhood Δ a possible dual peak has been identified, having a sign opposite to that of the first, the doublet-search module compares the amplitudes of the first peak selected and of the possible dual peak (block 26). If the two peaks have different amplitudes, the search for doublets D is resumed starting from block 23 with the selection of a new peak ((n+1)th peak). If the peak selected and the possible dual peak have substantially the same amplitude, the presence of a doublet D is recognized, and the data regarding the doublet identified are stored (block 27) (for example, the co-ordinates and amplitudes of the peaks are stored).

Finally (block 28), if the difference image has been completely scanned, there is supplied the list of the doublets D identified, accompanied by corresponding parameters. Otherwise, scanning proceeds starting from block 23, with the selection of a new peak ((n+1)th peak).

The method and apparatus according to the present invention advantageously enable estimation of the position $C_{MT}$ and velocity $V_M$ of a moving object in a much more precise way than what is possible using conventional methods that consider complete synthetic apertures.

In addition, the method and device according to the present invention are able to identify also those moving objects that possess a component of velocity exclusively according to the azimuth direction $D_A$.

Finally, the method described can function effectively using a single-channel radar transceiver and is very light from the computational standpoint.

According to a different embodiment of the invention, the recognition of the patterns is carried out according to a procedure that will be described hereinafter, with reference to FIGS. 7 and 8. In this case, the patterns that are sought in the difference images $I_D$ are a positive region RP and a negative region RN, which are dual with respect to one another. The positive region RP and the negative region RN are portions of a difference image $I_D$, in which the values of the pixels have a homogeneous sign, a positive sign and a negative sign, respectively. By "dual" it is meant, in this case, that the positive region RP and the negative region RN have substantially the same shapes and dimensions, except for pre-determined tolerances, and are both comprised in a confidence region RC, which has also a pre-determined extension (indicated by a dashed line in FIG. 7). In practice, the presence of dual positive regions RP and negative regions RN indicates the movement of an extended object.

Figure 8:
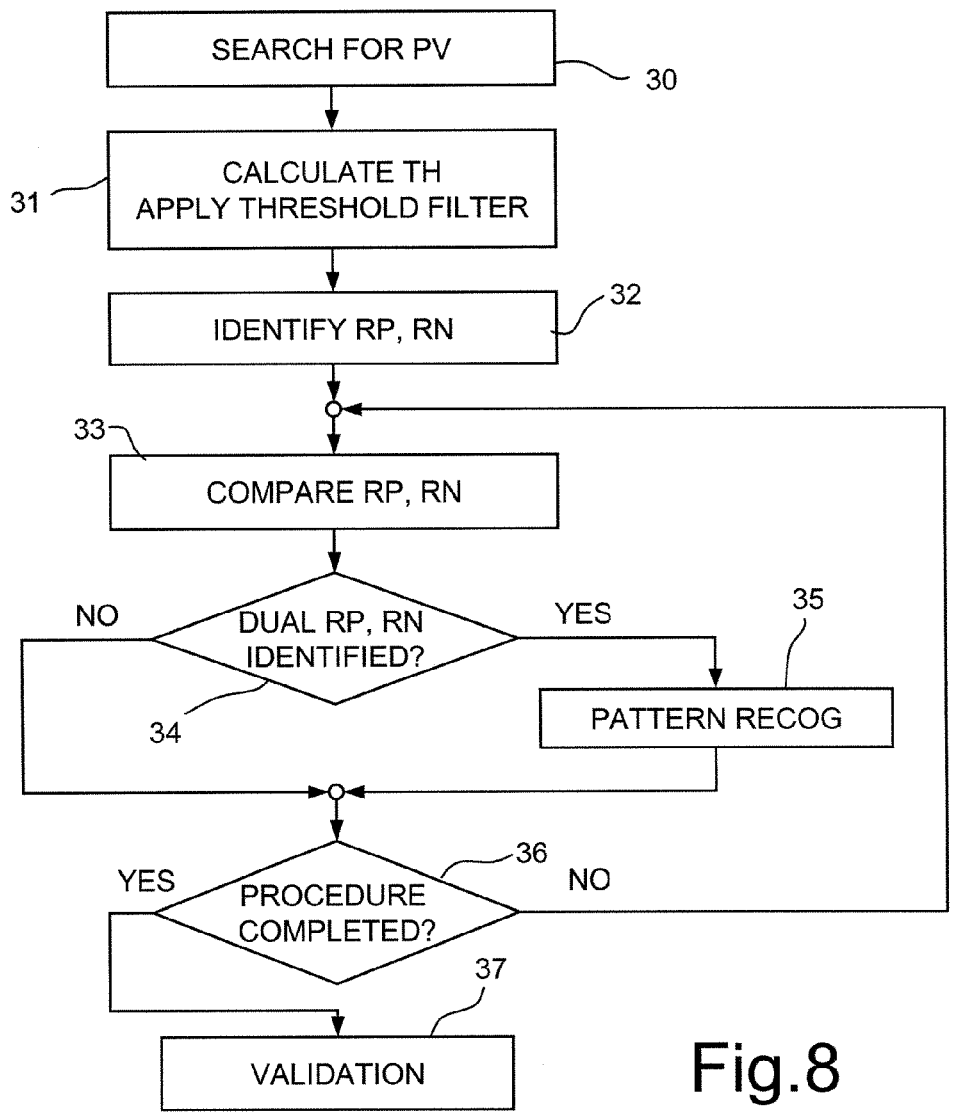
FIG. 8 is a flowchart of a procedure of a method according to a different embodiment of the present invention.
Figure 7:
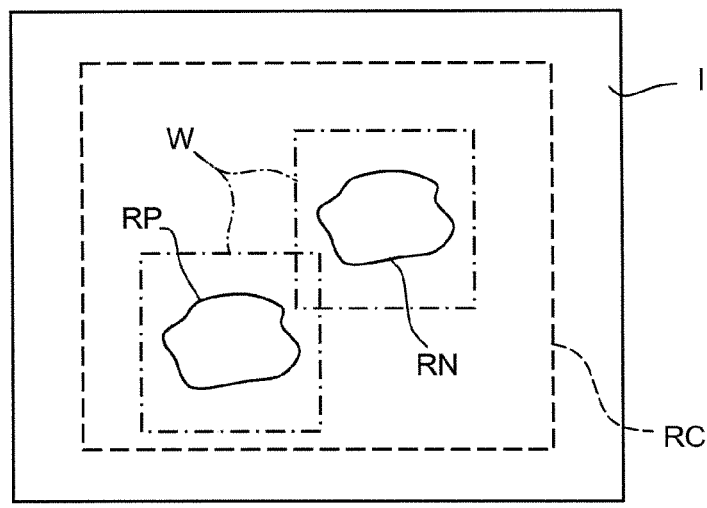
FIG. 7 shows a schematic representation of quantities regarding the method according to the present invention.

With reference to FIG. 8, the pattern-recognition module 14 is configured for initially searching for peak values PV in a difference image $I_D$ (block 30; see also FIG. 7). Then (block 31), a threshold filter is applied to portions of the difference image $I_D$ for generating a filtered image $I_F$. In greater detail, for each peak value PV a threshold TH is defined, that is equal to a pre-determined fraction of the peak value PV itself (for example, ½; note that each threshold TH has the same sign as the respective peak value PV). Then, using windows W of pre-determined dimensions (indicated with a dashed-and-dotted line in FIG. 7), centred on each peak value PV, the pattern-recognition module 14 calculates the pixels $I_F(x,y)$ of the filtered image $I_F$ on the basis of the values of the corresponding pixels $I_D(x,y)$ of the difference image $I_D$ in the following way (x and y indicate the co-ordinates in the range and azimuth directions, respectively):

$$I_F(x, y) = \begin{cases} 0 & \text{if } |I_D(x, y)| < |TH| \\ 1 & \text{if } I_D(x, y) > TH > 0 \\ -1 & \text{if } I_D(x, y) < TH < 0 \end{cases}$$

Once the operation of filtering around all the peak values PV previously identified is completed, the values of the remaining pixels of the filtered image $I_F$ are set equal to the values of the corresponding pixels of the difference image $I_D$.

Next (block 32), the filtered image $I_F$ is examined, and positive regions RP and negative regions RN having homogeneous and non-zero values are identified.

The morphological characteristics of adjacent positive regions RP and negative regions RN are then compared (block 33), considering a tolerance margin, in order to identify dual positive regions RP and negative regions RN. For example, the comparison is carried out by extraction and comparison of salient morphological characteristics (maximum and mean dimensions, area, perimeter, distribution about the centroid and the like; the tolerance is fixed in terms of maximum percentage difference admissible between corresponding characteristics).

When dual positive regions RP and negative regions RN are identified (output YES from block 34), the recognition of a pattern indicating a moving object 3 is completed (block 35). If a positive region RP and a negative region RN examined do not dually correspond, the recognition fails (output NO from block 34).

After the recognition procedure has been completed on all the positive regions RP and negative regions RN (output YES from block 36), a validation procedure (block 37) is carried out, substantially as previously described. In this case, the validation envisages that the presence of dual positive regions RP and negative regions RN is verified in a pre-determined number of consecutive difference images $I_D$. The velocity can be estimated, for example, on the basis of the positions of the centroids of the dual positive regions RP and negative regions RN.

Finally, it is evident that modifications and variations can be made to the device and method described herein, without thereby departing from the scope of the annexed claims.

The invention claimed is:

1. A method for the detection of moving objects by SAR images, comprising the steps of:
   generating a pulse-repetition frequency signal starting from a radar signal; and generating a sequence of SAR images starting from the pulse-repetition frequency signal;

the step of generating a sequence of SAR images comprises generating low azimuth resolution SAR images by means of coherent integration of the pulse-repetition frequency signal for a sub-aperture time shorter than an aperture time;

generating difference images through point-to-point difference between subsequent low azimuth resolution SAR images;

recognizing patterns associated with moving objects in the difference images;

identifying moving-object patterns defined by waveforms comprising a first region, where values of the waveform have a first negative or positive sign, and a second region, where values of the waveform in the second region have a second sign opposite to the first sign, and wherein pre-determined morphological characteristics of the first region and of the second region are the same, except for a pre-determined tolerance; and discriminating moving-object patterns from image components, which are not part of any moving-object pattern, in the difference images.

2. The method according to claim 1, wherein the patterns comprise a first peak and a second peak having substantially the same amplitude and opposite sign, the second peak being situated in a pre-determined neighborhood of the first peak.

3. The method according to claim 2, comprising the step of estimating a velocity of a moving object corresponding to a recognized pattern on the basis of a first position of the first peak of the recognized pattern, of a second position of the second peak of the recognized pattern, and of the sub-aperture time.

4. The method according to claim 1, wherein the step of recognizing patterns comprises identifying dual positive regions and negative regions in the difference image.

5. The method according to claim 4, wherein the step of identifying dual positive regions and negative regions comprises:

searching for peak values in the difference image; and applying a threshold filter to portions of the difference image centered around respective peak values.

6. The method according to claim 5, wherein the step of applying a threshold filter comprises associating a respective threshold to each peak value and wherein each threshold is equal to a pre-determined fraction of the associated peak value.

7. The method according to claim 4, comprising the step of comparing positive regions with negative regions.

8. The method according to claim 1, comprising the step of carrying out a validation procedure of the patterns recognized in each difference image.

9. The method according to claim 8, wherein the step of carrying out a validation procedure comprises tracking the recognized patterns a pre-determined number of consecutive difference images.

10. The method according to claim 9, wherein the step of tracking the recognized patterns comprises searching, in the pre-determined number of consecutive difference images, for series of recognized patterns compatible with the movement of an object having the velocity estimated on the basis of each pattern of the series.

11. The method according to claim 1, wherein the sub-aperture time is approximately 0.25 s.

12. The method according to claim 1, wherein the step of generating difference images comprises carrying out a point-to-point difference between two consecutive low azimuth resolution SAR images.

13. The method according to claim 1, comprising the step of irradiating and receiving the radar signal by a single-channel radar transceiver device.

14. An apparatus for detection of moving objects by SAR images comprising:

a radar transceiver device; and a pre-processing line, for generating a pulse-repetition frequency signal starting from the radar signal;

the pre-processing line comprises:

a sub-aperture generator, configured for generating a sequence of low azimuth resolution SAR images by coherent integration of the pulse-repetition frequency signal for a sub-aperture time shorter than an aperture time;

an image-difference module, for generating difference images through point-to-point difference between consecutive low azimuth resolution SAR images;

a pattern-recognition module for recognizing patterns associated to moving objects in the difference images and wherein the patterns are defined by waveforms, each comprising a first region, where values of the waveform have a first negative or positive sign, and a second region, where values of the waveform have a second sign opposite to the first sign, and wherein pre-determined morphological characteristics of the first region and of the second region are the same, except for a pre-determined tolerance;

a module configured to identify patterns associated with moving objects in the difference images; and a discrimination module configured for discriminating moving-object patterns from image components which are not part of any moving-object pattern, in the difference images.

15. The apparatus according to claim 14, wherein the patterns comprise a first peak and a second peak having substantially the same amplitude and opposite sign, the second peak being situated in a pre-determined neighborhood of the first peak.

16. The apparatus according to claim 14, comprising a validation module, configured for carrying out a validation procedure of the patterns recognized in each difference image.

17. The apparatus according to claim 16, wherein the validation module is configured for tracking the recognized patterns in a pre-determined number of consecutive difference images.

18. The apparatus according to claim 14, wherein the image-difference module is configured for carrying out a point-to-point difference between two consecutive low azimuth resolution SAR images.

19. The apparatus according to claim 14, wherein the radar transceiver device is of the single-channel type.

* * * * *